United States Patent [19]

Prior et al.

[11] 4,084,982
[45] Apr. 18, 1978

[54] FILLED INORGANIC RESIN CEMENTS AND COMPOSITIONS AND PROCESS FOR FORMING THEM

[75] Inventors: William L. Prior, Newark, Ohio; Richard S. Lindstrom, Reading, Mass.

[73] Assignee: Arthur D. Little, Inc., Cambridge, Mass.

[21] Appl. No.: 747,219

[22] Filed: Dec. 3, 1976

[51] Int. Cl.² .......................... C04B 9/02; C04B 9/04
[52] U.S. Cl. ..................................... 106/105; 106/106
[58] Field of Search ............................... 106/106, 105

[56] References Cited
U.S. PATENT DOCUMENTS 2,383,609  8/1945  MacDonald et al. ................ 106/106
2,543,959  3/1951  Eastin ................................... 106/106
2,546,971  4/1951  Byrns ................................... 106/106
3,320,077  5/1967  Prior .................................... 106/106

Primary Examiner—J. Poer
Attorney, Agent, or Firm—Bessie A. Lepper

[57] ABSTRACT

Magnesium oxide cements are formulated to contain microfiber fillers multidirectionally oriented throughout. Secondary reinforcing fillers may also be incorporated into these inorganic cements. The use of the microfiber fillers significantly increases the modulus of rupture and tensile and impact strengths of the magnesium oxide cements thus making them available for a wide range of uses including many now presently served by reinforced synthetic organic resins.

37 Claims, No Drawings

FILLED INORGANIC RESIN CEMENTS AND COMPOSITIONS AND PROCESS FOR FORMING THEM

This invention relates to filled inorganic resin cements, and to compositions and process for forming them, and more particularly to filled inorganic resin cements which are either magnesium oxychloride or magnesium oxysulfate and which have good flexural strength as well as being water-resistant, nonhygroscopic and nonflammable.

The magnesium oxide cements, generally referred to as inorganic resin or plastic cements, are known in the art. An improved process for the preparation of these inorganic resin cements (magnesium oxychloride and magnesium oxysulfate) is described in U.S. Pat. No. 3,320,077. These inorganic resin cements have found wide use in the manufacture of molded or cast structures such as construction panels, bricks, flooring and the like and as protective coatings for building bricks. Because of the inherent properties of such inorganic resin cements, and particularly because of their nonflammability, there exist many more potential uses for these materials than heretofore realized. Among such potential uses may be listed bathroom fixtures, mass transportation seating, aircraft interiors, office machinery and appliance housings, arena and other public seating, interior panels for trucks and buses, furniture and the like. In these potential uses, unlike in such uses as construction panels, bricks, flooring, etc., the structural material must possess a certain degree of flexural strength. The unfilled solid magnesium oxide cements and those filled with particulate materials and/or standard-length glass fibers in accordance with the teaching of the prior art (e.g., U.S. Pat. No. 3,320, 077) are relatively rigid and exhibit limited shear and tensile strength in directions in which there is little or no reinforcing fiber to prevent the forming of cracks throughout the magnesium oxide cement matrix or to prevent the crazing of the surface of the matrix. Such cracking begins as microcracks, and if the crack propagation is not halted, the microcracks may grow until the flexural, tensile and structural strengths of the item formed therefrom drop below an acceptable level. The same is true with surface crazing.

There is, of course, extensive prior art concerned with filled synthetic resins and plastics, e.g., filled polyesters and filled epoxies which are now being extensively used for many different applications. This art dealing with filled synthetic resins is not, however, directly translatable or applicable to the inorganic magnesium oxide cements. It may be postulated that this fact is due to the fundamental differences between these inorganic resin cements and synthetic organic resins. One of the more important of these differences lies in the fact that what is normally referred to as the "modulus" (defined as the slope of the stress-strain curve) is considerably less for the polyester or epoxy resin alone than for the glass fibers (or other reinforcing materials). Thus for example, while the modulus for a polyester resin may range from between about 300,000 and 600,000, that for glass fibers is in the range of 10,000,000 psi. The resin in a filled synthetic organic resin system therefore provides a matrix structure which is capable of some distortion to transfer stresses applied to the glass fiber filler which serves as reinforcement, taking up the stresses beyond the point at which the resin alone would experience stress failure.

In contrast to synthetic resins, the magnesium oxide cements have high modulus values in the same range as the fillers. Typically, the modulus for an unfilled magnesium oxide cement may be about 2,000,000. This in turn indicates that the magnesium oxide cement in an inorganic resin cement-glass fiber system can not distort under stress to transfer applied loads to long glass fibers without fracture and initial failure of the cement matrix. As will be apparent from the detailed description and data presented below, it is therefore not possible to substitute magnesium oxide cements for synthetic organic resins in the well-known organic resin-glass fiber systems; nor is it possible to use many of the accepted fillers for synthetic organic resins in forming filled magnesium oxide cements and still achieve optimum or even acceptable properties.

The fact that the magnesium oxide cements are water-resistant and nonflammable and that the raw material cost for their manufacture is less than for synthetic organic resins make it desirable to be able to provide a modified, e.g., filled, magnesium oxide cement which has good flexural strength, thus materially widening the range of applications for which these inorganic cements may be used, and making it possible to use them in place of the inflammable synthetic organic resins in a number of applications.

It is therefore a primary object of this invention to provide improved filled inorganic resin cements. It is another object to provide filled inorganic resin cements which possess a combination of flexural strength, tensile strength and impact strength that permits the use of such filled inorganic resin cements to replace filled synthetic organic resins in many applications. Yet a further object is to provide a water-resistant, nonflammable material for constructing a wide range of items including, but not limited to, bathroom fixtures, mass transportation, arena and other public seating, aircraft interiors, office machinery and appliance housings, interiors for trucks and buses, furniture and the like, panels, wallboard, structural elements, protective layers etc.

It is another primary object of this invention to provide compositions for forming filled inorganic resin cements, particularly filled magnesium oxide cements, which are used to manufacture filled inorganic resin cements possessing a combination of flexural, tensile and impact strengths which makes it possible to use the filled resin cements to replace the presently used filled organic resins in a number of applications, particularly where nonflammability is of importance.

It is yet another primary object of this invention to provide an improved process for forming filled inorganic resin cements. It is an additional object to provide a process of the character described which makes it possible to form filled inorganic resin structures by molding, pressing, lay-up techniques and the like.

Other objects of the invention will in part be obvious and will in part be apparent hereinafter.

According to one aspect of this invention there is provided a filled inorganic resin cement comprising in combination a magnesium oxide cement and a multidirectional, microfiber filler present in an amount from about 2% to about 40% by weight of the magnesium oxide cement. In a preferred embodiment of the product of this invention, the magnesium oxide cement is a magnesium oxychloride formed from a reactive composition containing no appreciable excess water which must be volatilized, the microfiber filler is present in a range from about 5% to about 20%, and is a milled glass fiber, substantially all of which passes through a U.S. Standard one-fourth inch screen. Macro fillers may also be incorporated in the filled inorganic resin.

According to another aspect of this invention, there is provided a liquid composition of matter suitable for molding, pressing, or the like to form a filled inorganic resin cement, the composition comprising in combination a reactive water slurry of a magnesium salt, magnesium oxide and a water-soluble phosphate having a viscosity ranging between about 700 and 15,000 centipoises; and from about 2% to about 40% by weight of the slurry of a microfiber filler blended through the slurry. In a preferred embodiment of the composition of this invention, the slurry is one in which the magnesium salt is magnesium chloride and the reactive water slurry is one which contains no appreciable excess of water once the reaction among the magnesium salt, magnesium oxide and water is completed. The composition may be molded or pressed or otherwise formed into a desired structure either with or without a macro filler such as a glass mat or a particulate material.

According to yet another aspect of this invention, there is provided a process for forming a filled inorganic plastic cement comprising the steps of forming a reactive water slurry of a magnesium salt, a water-soluble phosphate and magnesium oxide, the slurry having a viscosity ranging between about 700 and 15,000 centipoises; and blending into the water slurry, prior to its setting up, a quantity of a microfiber filler equivalent to between from about 2% and about 40% by slurry weight, the blending being such that the microfiber filler is nonplanar and multidirectional in the resulting filled inorganic plastic cement.

Formation of the inorganic plastic cement composition of this invention in which a filler is incorporated is, up to a certain point, preferably carried out in accordance with the teaching of U.S. Pat. No. 3,320,077. That is, up to the point of blending in the microfiber filler, it is preferable to use high shear blending in mixing the magnesium oxide into the gaging solution of magnesium salt and water-soluble phosphate additive. Therefore the process for the forming of the composition comprises the steps described below. The components, along with the ranges in which they may be used, will be identified in this process description.

The magnesium salt used may be either magnesium chloride used as the hexahydrate, $MgCl_2 \cdot 6H_2O$, or magnesium sulfate used as the heptahydrate, $MgSO_4 \cdot 7H_2O$. The first step of the process is the formation of a solution of the magnesium salt in water. This solution, known as the gaging solution, may be supersaturated with the magnesium salt and is preferably formed to contain a small amount of water-soluble phosphate. In preparing the gaging solution, the weight concentration of the magnesium salt (in the hydrated form) in the water solution formed should range between about 60% and 80% based on the weight of the hydrated salts, and preferably between about 70% and about 75%.

The role of the water-soluble phosphate is probably a multiple one. It is believed that it improves the wet strength of the filled inorganic resin cement formed, helps to control the viscosity of the liquid reaction composition within the desired range, sequesters the chelating chemical ions in the reaction system, assists in deflocculating the magnesium oxide and plays a role in crystal growth interference. Among the water-soluble phosphates which may be used are phosphoric acids, polyphosphates, or "glassy" phosphates, and particularly so-called sodium hexametaphosphate, various alkali metal mono- and dibasic phosphates, ammonium phosphates and the like. The term "sodium hexametaphosphate" is used, hereinafter, as is customary, to include a large number of glassy chain phosphates wherein the molar ratio of $Na_2/P_2O_5$ may range from about one to about 1.5. The amount of the water-soluble phosphate used may range up to about 6% by weight of the magnesium oxide added while a preferable range is between about 1% and 4%. Although either phosphoric acid or a glassy phosphate may be used alone, it has been found preferable, for reasons as yet not understood, to use a combination of these water-soluble phosphates. Although any combination of these phosphates may be used, a weight ratio of 2 to 1, phosphoric acid to glassy phosphate, has been found to be particularly effective in producing a finished microfiber-filled inorganic resin cement. Although phosphoric acid is soluble in the magnesium chloride solution, the glassy phosphates such as sodium hexametaphosphate are not soluble. Therefore, when a glassy phosphate is used, it is necessary to either dissolve it first in the water prior to adding the magnesium chloride or to dissolve it in phosphoric acid, in which latter case the solution of these two phosphates may be added either prior to, at the same time or after the magnesium chloride is added to the water.

The magnesium oxide used may be either natural or synthetic, the natural being preferred since it appears to produce a filled structure with somewhat higher flexural strength. A preferred form of magnesium oxide is one which has an iodine number between 15 and 60, a particle size distribution such that 50% is sized less than 0.2 to 0.3 micron and substantially all is sized less than 20 microns.

The amount of magnesium oxide depends upon the magnesium salt used to form the inorganic platic cement. If magnesium chloride is used, then the molar ratio of $MgCl_2 \cdot 6H_2O$ to MgO is between about 1 to 3 and about 1 to 9; while if $MgSO_4 \cdot 7H_2O$ is used the molar ratio is between about 1 to 3 and about 1 to 14. In the case of $MgCl_2 \cdot 6H_2O$ this means that the MgO weight percent of the total weight of $MgCl_2 \cdot 6H_2O$ and MgO may range from about 37% to 64%, while in the case of $MgSO_4 \cdot 7H_2O$ the MgO weight percent of the total weight may range from about 33% to about 70%.

In formulating the inorganic magnesium oxide cements to which the microfiber filler is added, it is preferable to choose gaging solution concentrations and ratios of MgO to $MgCl_2 \cdot 6H_2O$ (or $MgSO_4 \cdot 7H_2O$) so that there is formed a reactive water slurry containing no appreciable excess water which must be removed in the setting up and curing of the solid inorganic resin. By using essentially only that amount of water which enters into the reaction to form the final inorganic resin cement, there is essentially no excess water present to form $Mg(OH)_2$, and the quality of the cement, in terms of such parameters as strength, water resistance and uniformity of product, is maintained at the highest level.

The magnesium oxide is added to the magnesium salt solution containing the phosphate. It is preferable that the magnesium oxide be added slowly and it is important that the slurry during formation be processed in a high-speed/high-shear blender (e.g., a Daymax or Meyers in commercial production or a Manton-Gaulin continuous homogenizer) to defluocculate and thoroughly disperse the magnesium oxide particles. The use of very fine magnesium oxide and its thorough dispersion for reaction with the magnesium salt result in a low viscosity slurry. Thus the quality of the magnesium oxide is an important contributing factor to final filled inorganic resin cement.

As previously discussed, the role of the filler in the filled magnesium oxide cements is apparently not solely that of a reinforcing material. Due to the character of the solid magnesium oxide cements (high modulus and relatively low flexural strength) these cements may in themselves serve partly in the role of a filler, although they are not included within the meaning of the term "filler" as used herein. This in turn means that the added filler must be of such a nature as to contribute flexural strength as well as tensile and impact strengths. Because of this, the filler must be nonplanar, i.e., it can not be a material such as long glass fibers, or relatively large platelets or fine particulate material which, in effect, provides for two-dimensional reinforcement. The filler of this invention must, on the contrary, be so sized and configured to provide added strength in a multiplicity of directions, e.g., at least three directions which may, for simplicity, be thought of as width, length and depth. Hence, the filler is termed "multidirectional" for convenience to designate it as being nonplanar. In order to have a filler which meets these requirements, it is necessary that the filler contain sufficient short fibers to permit a sufficient amount of the filler to be multidirectionally oriented. These short fibers, termed herein "microfibers," should not be longer than about one-fourth inch. These microfibers serving as a filler and being multidirectionally oriented may serve in the dual role of filler and matrix, thus forming a filled magnesium oxide cement in which the roles of matrix and filler are not sharply delineated. It is believed that this is a situation unique to magnesium oxide cements.

The microfiber filler should be present in an amount ranging between about 2% and about 40% by weight of the inorganic resin cement. A preferred amount of microfiber filler ranges from between about 5% and 20%.

The preferred microfibers are those formed of glass, that is the filler is made up of short lengths of fiber glass. So-called "milled" fiber glass is particularly good since the milling process serves to separate the short glass fibers into separate entities which can be properly oriented through the inorganic resin cement. Milling also produces some small particulate pieces of glass, but sufficient individual fibers remain to achieve the primary purpose of the microfiber fillers. The microfibers may have aspect ratios ranging from about 5 to 1500. Exemplary of suitable fiber glass fillers are those having a length from one thirty-second to one fourth inch and a diameter of about 0.3 mils, giving aspect ratios from about 100 to 850.

The glass fibers used may be surface treated in accordance with known techniques which are fully described in the literature. (See, for example, "The Manufacturing Technology of Continuous Glass Fibres" by K. L. Lowenstein, Elsevier Scientific Publishing Company, New York, 1973, pp 191–233.) However, surface treatment of the glass fibers is not necessary as is seen from the data in Table 1 below.

Fibers other than those formed from glass which meet the specifications set forth may also be used. Such fibers include, but are not limited to, those formed of a mineral slag, asbestos and the like.

In making the liquid composition of this invention, the reactant slurry is formulated as described, and the microfiber filler in the desired amount is blended in. This may be done by adding the microfiber filler into the slurry tank and using slow-speed mixing, or by first transferring the slurry to a separate blender before the microfibers are added. The resulting slurry/filler composition may then be transferred to an appropriate mold for curing with or without added heat and with or without added pressure. The reactive slurry/filler mixture may also be used in very low or low-pressure matched die molding, in pultrusion or in filament winding.

The formation of magnesium oxide cement from the reactive slurry is somewhat exothermic and if it is not cooled prior to adding the filler to form the filled magnesium oxide cement, the heat of exothermy may be used to increase the rate of curing. Curing may also be accomplished at ambient temperatures or at elevated temperatures up to about 250° F.

Secondary fillers other than the microfiber fillers may be added in addition to the microfiber fillers. Such secondary fillers include, but are not limited to, longer fibers of such diverse materials such as glass, asbestos, mineral wool, and synthetic resins, and particulate fillers such as mica, talc and the like. So-called fiber glass mats comprise a preferred class of secondary filler. Such glass mats, now commerically available, may be of the nonwoven type formed from either continuous strands or chopped strands (typically about two inches in length) or of the woven type. These mats characteristically have weights from about one-half to two ounces or more per square foot. When fiber glass mats are used as the secondary filler, the filled magnesium oxide cement compositions are formed as a fiber glass laminate by any of the techniques known in the art for fabrication of such laminates with organic resins. Cure cycles will range from about 3 to 5 minutes in matched dies at 200° F to 250° F to 24 hours or more for ambient temperature cures. Addition of secondary fillers, other than glass fiber mats, may be accomplished by such well-known techniques as hand lay-up or spray-up, the reactive slurry/microfiber filler blend and secondary fillers being supplied through separate feeding means. The secondary fillers can be added to control the processing characteristics (i.e., viscosity, thixotropy, etc.) of the filled composition as well as the product properties.

The article, composition and method aspects of this invention will be further described in the following examples which are meant to be illustrative and not limiting.

The reactant slurry used in the following examples was formed by preparing a gaging solution containing 70% by weight of magnesium chloride hexahydrate. The gaging solution was made by adding the desired amount of water-soluble phosphate (designated in the specific examples) to 105.5 parts by weight of water and then adding 237.5 parts by weight of magnesium chloride hexahydrate to form a highly concentrated (70%) solution of the magnesium chloride. To this gaging solution was then added 282 parts by weight of magnesium oxide with high shear mixing to form the reactant slurry. Finally, the microfiber filler was uniformly blended into the reactant slurry. In preparing samples for determining modulus of rupture and impact strength, the slurry/filler blends thus formed were pressed or molded into panels either one eighth or one half inches thick, and in some cases these were heat cured. The test specimens were cut from these panels.

Modulus of rupture values were determined by using specimens which were 1 × 6 inches tested in accordance with ASTM Test D-790; and impact strengths (Charpy values) were obtained in accordance with ASTM Test D-256 Method B. In this latter test a swinging pendulum was used to strike the specimen, and the amount of energy required (in foot-pounds per square inch to break the specimen) was measured.

In the reactant slurry formulations used in obtaining the data of Table 1, the water-soluble phosphate component used was phosphoric acid in an amount equivalent to 2% by weight of the magnesium oxide.

Table 1

Effect of The Addition of Microfiber Fillers To Magnesium Oxide Cements on Modulus of Rupture and Impact Strength

| Example No. | Microfiber Filler Description | % by Wt | Modulus of Rupture psi | Impact ft lb/in$^2$ |
|---|---|---|---|---|
| 1 | None | — | 2100** | 1.4 |
| 2 | 1/4" starch treated* | 8 } | 6200 | 7.2 |
|   | 1/16" milled | 8 |  |  |
| 3 | 1/4" starch treated | 8 } | 3840 | 7.4 |
|   | 1/16" milled | 8 |  |  |
| 4 | 1/4" starch treated | 8 } | 3725 | 8.2 |
|   | polyester fibers | 8 |  |  |
| 5 | 1/4" strach treated | 12 | 7555 | 10.5 |
| 6 | 1/16" milled | 12 | 6040 | 2.5 |
| 7 | 1/4" water treated | 8 | 4060 | 3.6 |

*All 1/4" glass fibers were chopped strands.
**1% sodium hexametaphosphate in place of $H_3PO_4$.

The effect of the addition of microfiber fillers to magnesium oxide cements on modulus of rupture and impact strength is shown in Table 1. In Examples 2-7, these measured values are each the average of two measurements. It will be seen that the addition of the microfiber fillers significantly increased the modulus of rupture over that for unfilled magnesium oxide cement; and that these fillers increased impact strength by a factor of from about 2 to 7.

One of the most important properties required of a material formed into various configurations, e.g., a bathroom vanity, is tensile strength. In order to determine the tensile strength of the filled magnesium oxide cement of this invention, a reactant slurry was made as described above using 2% by magnesium oxide weight of phosphoric acid as the water-soluble phosphate component. To this slurry was then added 8% by slurry weight of one sixteenth inch startch-treated milled glass fibers. The resulting slurry/filler blend was then sprayed onto an acrylic sheet formed into a vanity. A series of one-inch square specimens were cut from the vanity and bonded between one-inch square blocks of aluminum. Tensile strengths were determined by pulling the blocks in tension until they broke in accordance with ASTM Test C-297 procedure. The results of eight such measurements are tabulated as Examples 8-15 in Table 2.

Table 2

Effect of The Addition of Microfiber Fillers To Magnesium Oxide Cements on Tensile Strength

| Example No. | Type of Filler | Tensile Strength Psi |
|---|---|---|
| 8 | 8% 1/16" starch treated milled glass | 506 |
| 9 | 8% 1/16" starch treated milled glass | 627 |

Table 2-continued

Effect of The Addition of Microfiber Fillers To Magnesium Oxide Cements on Tensile Strength

| Example No. | Type of Filler | Tensile Strength Psi |
|---|---|---|
| 10 | 8% 1/16" starch treated milled glass | 638 |
| 11 | 8% 1/16" starch treated milled glass | 539 |
| 12 | 8% 1/16" starch treated milled glass | 693 |
| 13 | 8% 1/16" starch treated milled glass | 616 |
| 14 | 8% 1/16" starch treated milled glass | 512 |
| 15 | 8% 1/16" starch treated milled glass | 563 |
| 16 | 6% 2" chopped glass roving | 190 |
| 17 | 6% 2" chopped glass roving | 108 |

In order to compare the tensile strength of the filled magnesium oxide cements of this invention with magnesium oxide cements containing long glass fiber reinforcing material, the same vanity configuration formed of an acrylic sheet was sprayed with the same reactant slurry and two-inch chopped glass roving by the well-known spray-up procedure in which the reactant slurry and glass fibers from a chopper were simultaneously but separately directed onto the acrylic sheet. Tensile strengths of this reinforced magnesium oxide cement were measured in the same manner, and the results of two measurements are tabulated as Examples 16 and 17 in Table 2.

The average tensile strength of the magnesium oxide cement made in accordance with this invention is about 600 psi, while that for the identical inorganic cement reinforced with the longer glass fibers averages 149 psi. This represents a fourfold increase in tensile strength and a significant improvement in the properties of the microfiber filled inorganic resin.

The data in Table 3 illustrate the use of a secondary filler (glass mat) in conjunction with the microfiber filler.

Table 3

Effect of the Addition of Glass Fiber Mat as Secondary Filler on Modulus of Rupture of Magnesium Oxide Cement

| Example No. | Microfiber Filler Type | % by Wt | Glass Mat % by Wt | Modulus of Rupture psi |
|---|---|---|---|---|
| 18 | — | — | 21.0 | 10,000 |
| 19 | slag (mineral) | 5 | 18.7 | 13,500 |
| 20 | 1/4" milled glass | 5 | 19.0 | 13,100 |
| 21 | 1/4" treated milled glass | 5 | 19.5 | 15,100 |
| 22 | — | — | 21 | 10,900 |
| 23 | 1/16" milled glass | 5 | 19.0 | 14,200 |
| 24 | 1/16" milled glass | 8 | — | 2,310 |

The reactant slurries used to form Examples 18-21 contained 2% phosphoric acid and 1% sodium hexametaphosphate by magnesium oxide weight as the water-soluble phosphate component, while the slurries of examples 22-24 contained 2% phosphoric acid only. The test panels used for Examples 18-21 and 24 were hot molded by placing the liquid composition of slurry/filler blend in a plate mold containing, if required, a glass mat and heating at 230° F. The test panels used for Examples 22 and 23 were prepared in a similar manner without heating, i.e., were cold molded. The glass mats used were of the random nonwoven continuous strand type.

It will be seen from Table 3 that when glass mats alone were used (Examples 18 and 22), the modulus of rupture was less than when a microfiber filler was added to the slurry. It is also important to note that the combination of the microfiber filler and secondary filler results in a synergistic effect, for the modulus of rupture of the combined filler, 14,200 psi (Example 23), was greater than the combined value of 13,210 psi for the mat alone (10,900 psi) and the one-sixteenth inch milled glass fiber alone (2,310 psi) as shown in Examples 22 and 24.

A reactant slurry formulated as described above was made up using 2% by magnesium oxide weight of phosphoric acid as the water-soluble phosphate component. To this slurry was added a quantity of blown mineral fibers less than one-fourth inch in length in an amount equal to 40% by weight of the slurry. The resulting slurry/filler blend was a dough-like composition that could be calendered or pressed into a mold to form a desired configuration.

It will be seen from the above examples that the addition of microfiber fillers multidirectionally oriented throughout a magnesium oxide cement contributes significantly to the physical properties of this type of inorganic resin cement. Of particular significance is the marked increase in tensile strength realized when the microfiber fillers are used and the synergistic effect attained when the microfiber fillers are used in conjunction with a secondary filler such as a glass mat. It is believed that in the latter case the microfiber fillers are able to transfer stresses through the magnesium oxide cement matrix so that any load applied to such a cement is transmitted to a secondary filler serving as a reinforcement. Thus it appears that through this mechanism magnesium oxide cements may be effectively reinforced and made available for many uses heretofore not amenable to using the unfilled magnesium oxide cements.

It will thus be seen that the objects set forth above, among those made apparent from the preceding description, are efficiently attained, and, since certain changes may be made in carrying out the above process, and in the composition and article set forth without departing from the scope of the invention, it is intended that all matter contained in the above description shall be interpreted as illustrative and not in a limiting sense.

We claim:

1. A filled inorganic resin cement, comprising in combination
   (a) a magnesium oxide cement which is the reaction product of active MgO and an aqueous, soluble phosphate-containing slurry of a magnesium salt selected from the group consisting of $MgCl_2.6H_2O$ and $MgSO_4.7H_2O$, the concentration of said magnesium salt in said slurry prior to reaction with said MgO being between about 60% and 80% by weight, the molar ratio of $MgCl_2.6H_2O$ to MgO ranging between about 1 to 3 and about 1 to 9 and of $MgSO_4.7H_2O$ to MgO ranging between about 1 to 3 and about 1 to 14, said reaction product being further characterized in that essentially all of the water of said slurry and the water of hydration of said magnesium salt are consumed in the reaction and are contained in said reaction product; and
   (b) a multidirectional, microfiber filler blended into said slurry subsequent to the addition of said MgO thereto and distributed throughout said cement, said filler being present in an amount ranging from about 2% to about 40% by weight of said magnesium oxide cement.

2. A filled inorganic resin cement in accordance with claim 1 wherein said magnesium salt is magnesium chloride hexahydrate.

3. A filled inorganic resin cement in accordance with claim 1 wherein said soluble phosphate is a glassy phosphate, phosphoric acid or a mixture thereof.

4. A filled inorganic resin cement in accordance with claim 3 wherein said phosphate component is a mixture of glassy phosphate and phosphoric acid in a weight ratio of about 1 to 2 and said phosphate component amounts to up to about 6% by weight of said magnesium oxide.

5. A filled inorganic resin cement in accordance with claim 2 wherein said molar ratio of said magnesium chloride hexahydrate to said magnesium oxide is about 1 to 6.

6. A filled inorganic resin cement in accordance with claim 1 wherein said microfiber filler comprises short fibers sized such that substantially all of them are no longer than 1/4 inch.

7. A filled inorganic resin cement in accordance with claim 6 wherein said fibers have aspect ratios between about 5 and 1500.

8. A filled inorganic resin cement in accordance with claim 7 wherein said short fibers are formed of a mineral slag.

9. A filled inorganic resin cement in accordance with claim 7 wherein said short fibers are formed of glass.

10. A filled inorganic resin cement in accordance with claim 9 wherein said glass fibers are milled.

11. A filled inorganic resin cement in accordance with claim 9 wherein said glass fibers are surface treated.

12. A filled inorganic resin cement in accordance with claim 1 including up to about 20% by weight of said magnesium oxide cement of a secondary filler.

13. A filled inorganic resin cement in accordance with claim 12 wherein said secondary filler comprises a glass mat.

14. A filled inorganic resin cement in accordance with claim 12 wherein said secondary filler comprises fibers having lengths greater than said microfiber filler.

15. A liquid composition suitable for forming a filled inorganic resin cement, comprising in combination
   (a) a reactive water slurry of a magnesium salt selected from the group consisting of $MgCl_2.6H_2O$ and $MgSO_4.7H_2O$, reactive magnesium oxide and a water-soluble phosphate component, the concentration of said magnesium salt in said slurry ranging between about 60% and 80% by total weight of said magnesium salt and the water of said slurry, the molar ratio of $MgCl_2.6H_2O$ to MgO ranging between about 1 to 3 and about 1 to 9 and of $MgSO_2.7H_2O$ to MgO ranging between about 1 to 3 and about 1 to 14 whereby the total water content of said slurry is not appreciably in excess of that consumed in forming said resin cement, said slurry having a viscosity ranging between about 700 and 15,000 centipoises; and
   (b) from about 2% to about 40% by weight of said slurry of a microfiber filler blended throughout said reactive slurry.

16. A liquid composition in accordance with claim 15 wherein said magnesium salt is magnesium chloride hexahydrate, and the molar ratio of said magnesium chloride hexahydrate to said magnesium oxide is about 1 to 6.

17. A liquid composition in accordance with claim 15 wherein said water-soluble phosphate component is a glassy phosphate, phosphoric acid or a mixture thereof.

18. A liquid composition in accordance with claim 17 wherein said phosphate component is a mixture of glassy phosphate and phosphoric acid in a weight ratio of about 1 to 2 and said phosphate component amounts to up to about 6% by weight of said magnesium oxide.

19. A liquid composition in accordance with claim 15 wherein said microfiber filler comprises short fibers sized such that substantially all of them are no longer than 1/4 inch.

20. A liquid composition in accordance with claim 19 wherein said fibers have aspect ratios between about 5 and 1500.

21. A liquid composition in accordance with claim 20 wherein said short fibers are formed of a mineral slag.

22. A liquid composition in accordance with claim 19 wherein said short fibers are formed of glass.

23. A liquid composition in accordance with claim 22 wherein said glass fibers are milled.

24. A liquid composition in accordance with claim 22 wherein said glass fibers are surface treated.

25. A process for forming a filled inorganic resin cement, comprising the steps of
(a) forming a reactive water slurry of a magnesium salt selected from the group consisting of $MgCl_2.6H_2O$ and $MgSO_4.7H_2O$, a water-soluble phosphate component and magnesium oxide, the concentration of said magnesium salt in said slurry ranging between about 60% and 80% by total weight of said magnesium salt and the water of said slurry, the molar ratio of $MgCl_2.6H_2O$ to MgO ranging between about 1 to 3 and about 1 to 9 and of $MgSO_4.7H_2O$ to MgO ranging between about 1 to 3 and about 1 to 14 whereby the total water content of said slurry is not appreciably in excess of that consumed in forming said resin cement, said slurry having a viscosity ranging between about 700 and 15,000 centipoises;
(b) blending into said reactive water slurry, after its formation but prior to its setting up, a quantity of microfiber filler equivalent to between from about 2% and about 40% by slurry weight, said blending being such that said microfiber filler is nonplanar and multidirectional in the resulting filled inorganic resin cement composition.

26. A process in accordance with claim 25 wherein said magnesium salt is magnesium chloride hexahydrate, the molar ratio of said magnesium chloride hexahydrate to said magnesium oxide is about 1 to 6 and said water-soluble phosphate component is a glassy phosphate, phosphoric acid or a mixture thereof present in said slurry in an amount up to about 6% by weight of said magnesium oxide.

27. A process in accordance with claim 25 wherein said microfiber filler comprises short fibers sized such that substantially all of them are no longer than one-fourth inch.

28. A process in accordance with claim 27 wherein said fibers have aspect ratios between about 5 and 1500.

29. A process in accordance with claim 27 wherein said short fibers are formed of a mineral slag.

30. A process in accordance with claim 27 wherein said short fibers are formed of glass.

31. A process in accordance with claim 30 wherein said glass fibers are milled.

32. A process in accordance with claim 30 wherein said glass fibers are surface treated.

33. A process in accordance with claim 25 including the step of forming said filled inorganic resin cement composition into a desired configuration.

34. A process in accordance with claim 33 including the further step of curing the filled inorganic resin cement composition at an elevated temperature up to about 250° F.

35. A process in accordance with claim 33 including the further step of adding a secondary filler during said step of forming said desired configuration.

36. A process in accordance with claim 35 wherein said secondary filler comprises fibers of a length greater than said microfiber filler, and said step of adding said secondary filler comprises spraying up said fibers with said filled inorganic resin cement composition.

37. A process in accordance with claim 35 wherein said secondary filler comprises a glass mat and said step of adding said secondary filler comprises impregnating said mat with said filled inorganic resin cement under pressure and at a temperature between about 200° F and 250° F to form a laminate.

* * * * *